US011754151B2

(12) United States Patent
Kuroki

(10) Patent No.: US 11,754,151 B2
(45) Date of Patent: Sep. 12, 2023

(54) CONTINUOUSLY VARIABLE TRANSMISSION FOR VEHICLE

(71) Applicants:JATCO Ltd, Fuji (JP); NISSAN MOTOR CO., LTD., Yokohama (JP)

(72) Inventor: Atsushi Kuroki, Yokohama (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 377 days.

(21) Appl. No.: 17/270,277

(22) PCT Filed: Sep. 9, 2019

(86) PCT No.: PCT/JP2019/035331
§ 371 (c)(1),
(2) Date: Feb. 22, 2021

(87) PCT Pub. No.: WO2020/084937
PCT Pub. Date: Apr. 30, 2020

(65) Prior Publication Data
US 2021/0254688 A1    Aug. 19, 2021

(30) Foreign Application Priority Data
Oct. 22, 2018 (JP) .................................. 2018-198805

(51) Int. Cl.
*F16H 9/18*    (2006.01)
*F16H 61/662*    (2006.01)
(Continued)

(52) U.S. Cl.
CPC .............. *F16H 9/18* (2013.01); *F16H 61/662* (2013.01); *F16H 59/04* (2013.01); *F16H 59/44* (2013.01)

(58) Field of Classification Search
CPC .. F16H 61/66272; F16H 63/065; F16H 55/56; F16H 61/662; F16H 61/66259; F16H 9/18; F16H 59/04; F16H 59/44
(Continued)

(56) References Cited

U.S. PATENT DOCUMENTS 2,802,367 A * 8/1957 Hoover ............... F16H 61/6624
474/15
3,478,611 A * 11/1969 Forest ..................... F16H 55/56
474/16
(Continued)

FOREIGN PATENT DOCUMENTS

JP    2008-075792 A    4/2008
JP    2009-228808 A    10/2009
(Continued)

*Primary Examiner* — Henry Y Liu
(74) *Attorney, Agent, or Firm* — Foley & Lardner LLP

(57) ABSTRACT

A continuously variable transmission for a vehicle includes: a variator including; a primary pulley, a secondary pulley, and an endless annular member wound around the primary pulley and the secondary pulley, the secondary pulley being provided with an urging member configured to generate an urging force in a direction in which a groove width of the secondary pulley is decreased, and a transmission gear ratio of the variator being brought to a high side of a lowest transmission gear ratio by a centrifugal hydraulic operation of an oil stored in a pulley pressure receiving chamber of the primary pulley when a vehicle speed becomes equal to or greater than a predetermined vehicle speed when the vehicle is towed.

2 Claims, 4 Drawing Sheets

(51) Int. Cl.
  *F16H 59/04* (2006.01)
  *F16H 59/44* (2006.01)
(58) Field of Classification Search
  USPC .................................................. 474/28, 16
  See application file for complete search history.

(56) References Cited

U.S. PATENT DOCUMENTS

| | | | | | |
|---|---|---|---|---|---|
| 4,023,425 | A | * | 5/1977 | Parker | F16H 61/6624 474/16 |
| 5,310,384 | A | * | 5/1994 | Siemon | F16H 59/38 474/18 |
| 5,342,247 | A | * | 8/1994 | Adriaenssens | F16H 61/66272 474/18 |
| 5,399,123 | A | * | 3/1995 | Blackburn | F16H 55/563 474/18 |
| 5,871,411 | A | * | 2/1999 | Senger | F16H 61/66254 474/11 |
| 6,089,999 | A | * | 7/2000 | Imaida | F16H 55/56 474/18 |
| 6,280,357 | B1 | * | 8/2001 | Van Spijk | F16H 61/66272 474/16 |
| 6,459,978 | B2 | * | 10/2002 | Taniguchi | F16H 61/66259 475/116 |
| 6,591,177 | B1 | * | 7/2003 | Loffler | F16H 61/12 474/18 |
| 7,222,005 | B2 | * | 5/2007 | Kang | F16H 61/12 474/18 |
| 7,341,533 | B2 | * | 3/2008 | Wang | F16H 57/021 427/451 |
| 7,402,118 | B2 | * | 7/2008 | Kimura | F16H 61/66254 474/18 |
| 7,666,110 | B2 | * | 2/2010 | Iwatsuki | F16H 61/66272 474/28 |
| 7,686,715 | B2 | * | 3/2010 | Carlson | F16H 63/065 474/18 |
| 7,806,791 | B2 | * | 10/2010 | Izumi | F16H 61/66272 474/18 |
| 7,922,610 | B2 | * | 4/2011 | Nihei | F16H 61/0021 474/18 |
| 7,951,025 | B2 | * | 5/2011 | Mitsubori | F02B 75/02 474/43 |
| 7,951,026 | B2 | * | 5/2011 | Soga | F16H 61/0206 474/28 |
| 8,100,791 | B2 | * | 1/2012 | Yamaguchi | F16H 63/065 184/7.3 |
| 8,460,137 | B2 | * | 6/2013 | Kajigaya | G01P 3/443 474/18 |
| 8,798,877 | B2 | * | 8/2014 | Ayabe | F16H 61/66259 474/18 |
| 8,857,382 | B2 | * | 10/2014 | Yagasaki | F16H 61/0031 477/45 |
| 2001/0049312 | A1 | * | 12/2001 | Warner | F16H 63/065 474/18 |
| 2002/0142870 | A1 | * | 10/2002 | Okano | F16H 9/125 474/18 |
| 2004/0209719 | A1 | * | 10/2004 | Ochiai | B60W 10/04 474/18 |
| 2005/0090340 | A1 | * | 4/2005 | Wang | F16H 55/56 474/8 |
| 2005/0107195 | A1 | * | 5/2005 | Katou | F16H 63/065 474/18 |
| 2005/0181899 | A1 | * | 8/2005 | Plath | F16H 61/66272 474/18 |
| 2005/0266944 | A1 | * | 12/2005 | Kuwabara | F16H 55/56 474/18 |
| 2007/0142142 | A1 | * | 6/2007 | Yamaguchi | F16H 61/66272 474/18 |
| 2007/0298917 | A1 | * | 12/2007 | Faust | F16H 63/065 474/18 |
| 2009/0176607 | A1 | * | 7/2009 | Muller | F16H 61/66272 474/18 |
| 2010/0120562 | A1 | * | 5/2010 | Kadokawa | F16H 9/18 474/28 |
| 2010/0234152 | A1 | * | 9/2010 | Gotz | F16H 63/065 474/28 |
| 2010/0248874 | A1 | * | 9/2010 | Katou | F16H 61/66272 474/28 |
| 2011/0230285 | A1 | * | 9/2011 | Hinami | F16H 61/0021 474/28 |
| 2012/0032405 | A1 | * | 2/2012 | Nishizawa | F16J 15/3208 277/505 |
| 2012/0244974 | A1 | * | 9/2012 | Tsuji | F16H 55/56 474/28 |
| 2013/0165282 | A1 | * | 6/2013 | Hattori | F16H 61/02 474/28 |
| 2014/0128188 | A1 | * | 5/2014 | Ouchida | F16H 61/00 474/28 |
| 2014/0274505 | A1 | * | 9/2014 | Kinoshita | F16H 61/12 474/28 |
| 2014/0342860 | A1 | * | 11/2014 | Suzuki | F16H 61/66259 474/28 |
| 2014/0378251 | A1 | * | 12/2014 | Ishino | F16H 9/16 475/210 |
| 2015/0148158 | A1 | * | 5/2015 | Nishida | F16H 61/662 91/419 |
| 2015/0330417 | A1 | * | 11/2015 | Kurihara | F15B 15/14 92/170.1 |
| 2015/0369363 | A1 | * | 12/2015 | Kanehara | F16H 61/0025 474/28 |
| 2016/0047470 | A1 | * | 2/2016 | Aoki | F16H 9/18 474/28 |
| 2017/0152924 | A1 | * | 6/2017 | Tsuji | F16H 55/56 |
| 2018/0003298 | A1 | * | 1/2018 | Yagasaki | F16H 61/66259 |

FOREIGN PATENT DOCUMENTS

JP 2009-275718 A 11/2009
JP 2018-071746 A 5/2018

* cited by examiner

CONTINUOUSLY VARIABLE TRANSMISSION FOR VEHICLE

TECHNICAL FIELD

This invention relates to a continuously variable transmission for a vehicle.

BACKGROUND ART

A variator of a continuously variable transmission for a vehicle includes, as a basic configuration, a pair of pulleys (primary pulley and secondary pulley), and a belt wound around the pulleys (for example, a patent document 1).

Each of the pulleys includes a fix pulley, and a slide pulley configured to be moved in a rotation axis direction on a shaft portion of the fix pulley.

The variator is configured to adjust a hydraulic pressure supplied to a pulley pressure chamber provided to the slide pulley, to vary a groove width between the fix pulley and the slide pulley, and thereby to vary winding radii of the belt in the pair of the pulleys (the primary pulley and the secondary pulley).

The secondary pulley is provided with a return spring configured to prevent the belt slippage when the vehicle is towed. The return spring is configured to generate the belt clamping force between the fix pulley and the slide pulley to prevent the belt slippage when the hydraulic pressure is not supplied to the pulley pressure receiving chamber when the vehicle is towed.

The clamping force of the secondary pulley dominates the generation of the belt slippage. The return spring is not provided to the primary pulley side. Moreover, in the towed state, the hydraulic pressure is not supplied to both of the pulley pressure receiving chamber of the primary pulley side, and the pulley pressure receiving chamber of the secondary pulley side.

In this case, the transmission gear ratio in the towed state is determined in accordance with the thrust difference between the primary pulley and the secondary pulley. The clamping force of the secondary pulley provided with the return spring becomes greater. Accordingly, in the towed state, the transmission gear ratio of the variator becomes the lowest transmission gear ratio state.

The state where the transmission gear ratio of the variator is the lowest transmission gear ratio state when viewed from the input shaft side means the highest transmission gear ratio state when viewed from the output shaft side. Accordingly, the primary pulley reaches the extremely high rotation speed in accordance with the increase of the vehicle speed in the towed state.

When the primary pulley reaches the extremely high rotation speed, for example, there are concerns that the durability of the bearing abutted on the primary pulley is influenced.

Accordingly, it is required to suppress the rotation speed of the primary pulley in the towed state.

PRIOR ART DOCUMENT

Patent Document

Japanese Patent Application Publication No. 2008-75792

SUMMARY OF THE INVENTION

In the present invention, a continuously variable transmission for a vehicle comprises:

a variator including;
a primary pulley,
a secondary pulley, and
an endless annular member wound around the primary pulley and the secondary pulley,
the secondary pulley being provided with an urging member configured to generate an urging force in a direction in which a groove width of the secondary pulley is decreased, and
a transmission gear ratio of the variator being brought to a high side of a lowest transmission gear ratio by a centrifugal hydraulic operation of an oil stored in a pulley pressure receiving chamber of the primary pulley when a vehicle speed becomes equal to or greater than a predetermined vehicle speed when the vehicle is towed.

In the present invention, when the vehicle speed becomes equal to or greater than the predetermined vehicle speed in the towed state of the vehicle, when the primary pulley becomes the high rotation speed, the centrifugal force is acted to the oil stored in the pulley pressure receiving chamber of the primary pulley so as to generate the centrifugal hydraulic operation to generate the thrust in the direction in which the groove width of the primary pulley is decreased.

With this, the thrust difference between the primary pulley and the secondary pulley is decreased, so that the transmission gear ratio of the variator becomes the high side.

This variation of the transmission gear ratio is acted in a direction in which the rotation speed of the primary pulley is decreased in accordance with the increase of the vehicle speed. Accordingly, it is possible to prevent the primary pulley from reaching the extremely high rotation speed.

DESCRIPTION OF EMBODIMENTS

Hereinafter, a belt type continuously variable transmission 1 for a vehicle according to an embodiment of the present invention is explained.

Figure 1:
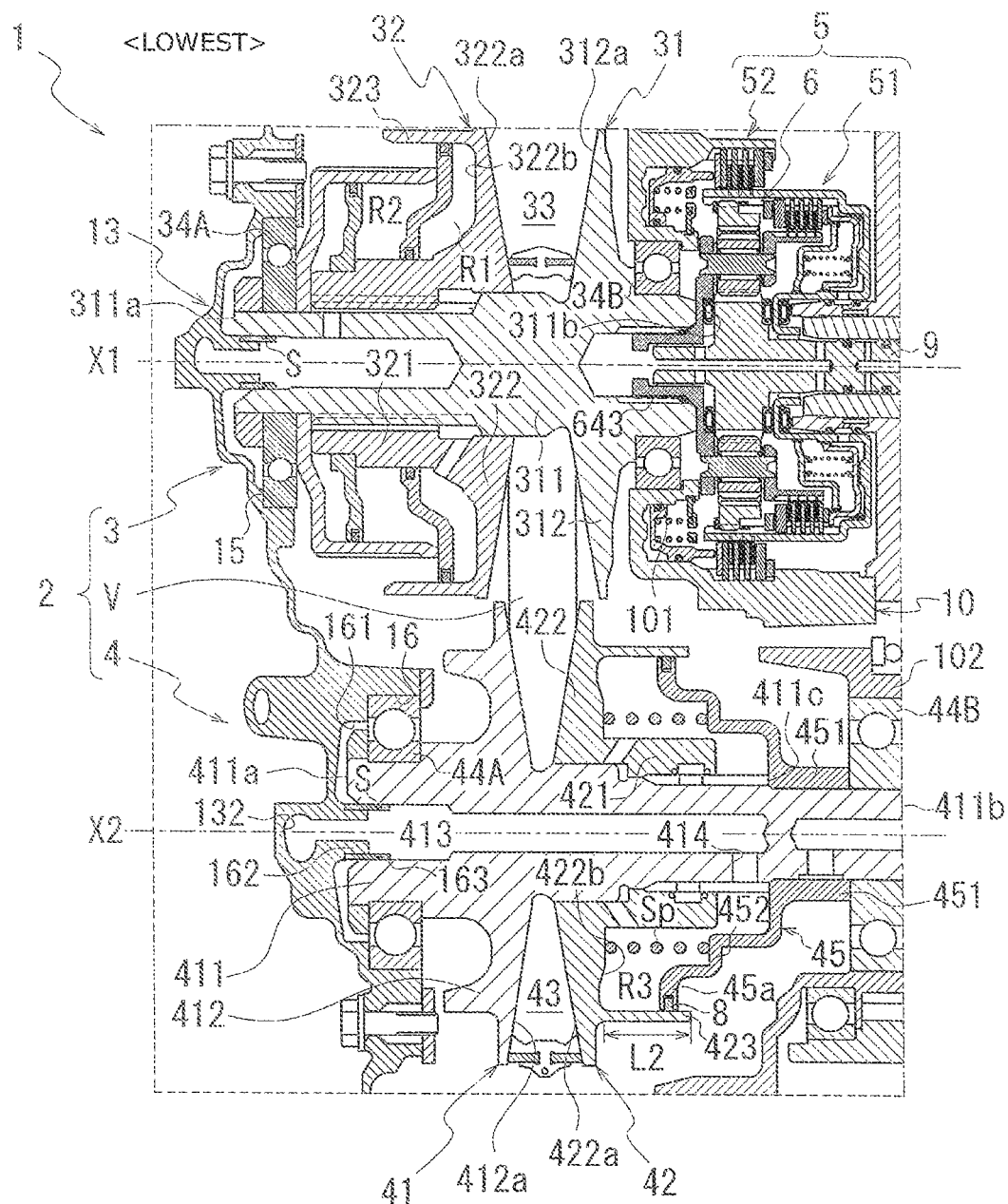
FIG. 1 is a view for explaining a main part of a continuously variable transmission.

FIG. 1 is a view for explaining a main part of the continuously variable transmission 1.

Figure 2:
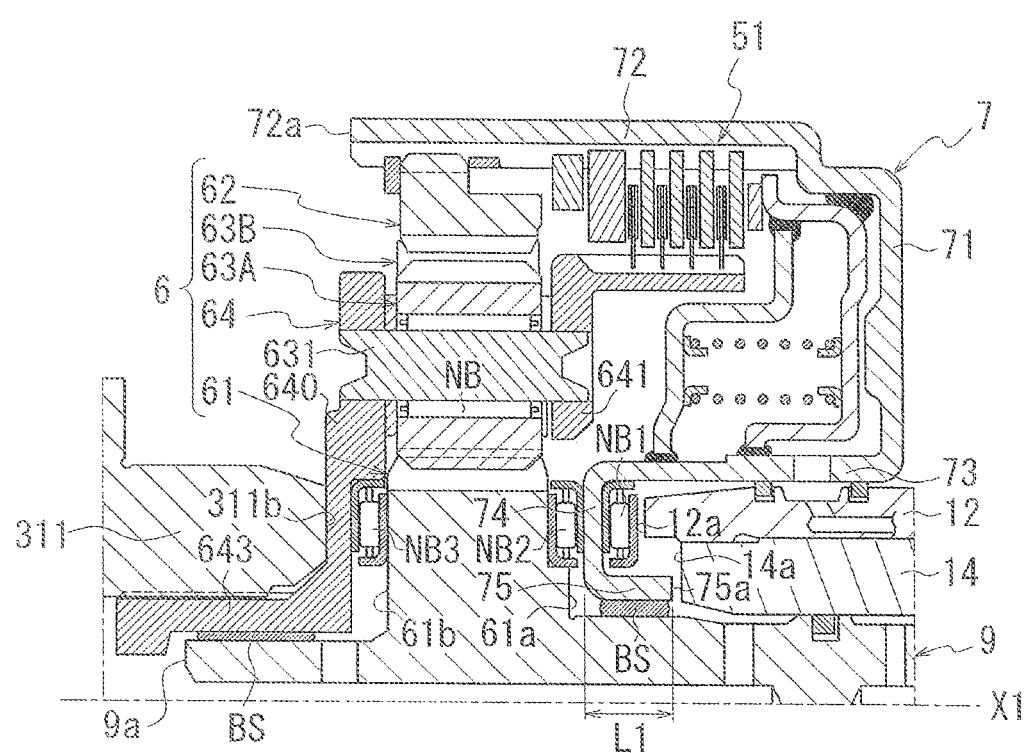
FIG. 2 is a view for explaining a main configuration around a planetary gear set of a forward and backward switching mechanism.

FIG. 2 is a view for explaining a main configuration around a planetary gear set 6 of a forward and backward switching mechanism 5.

Figure 3:
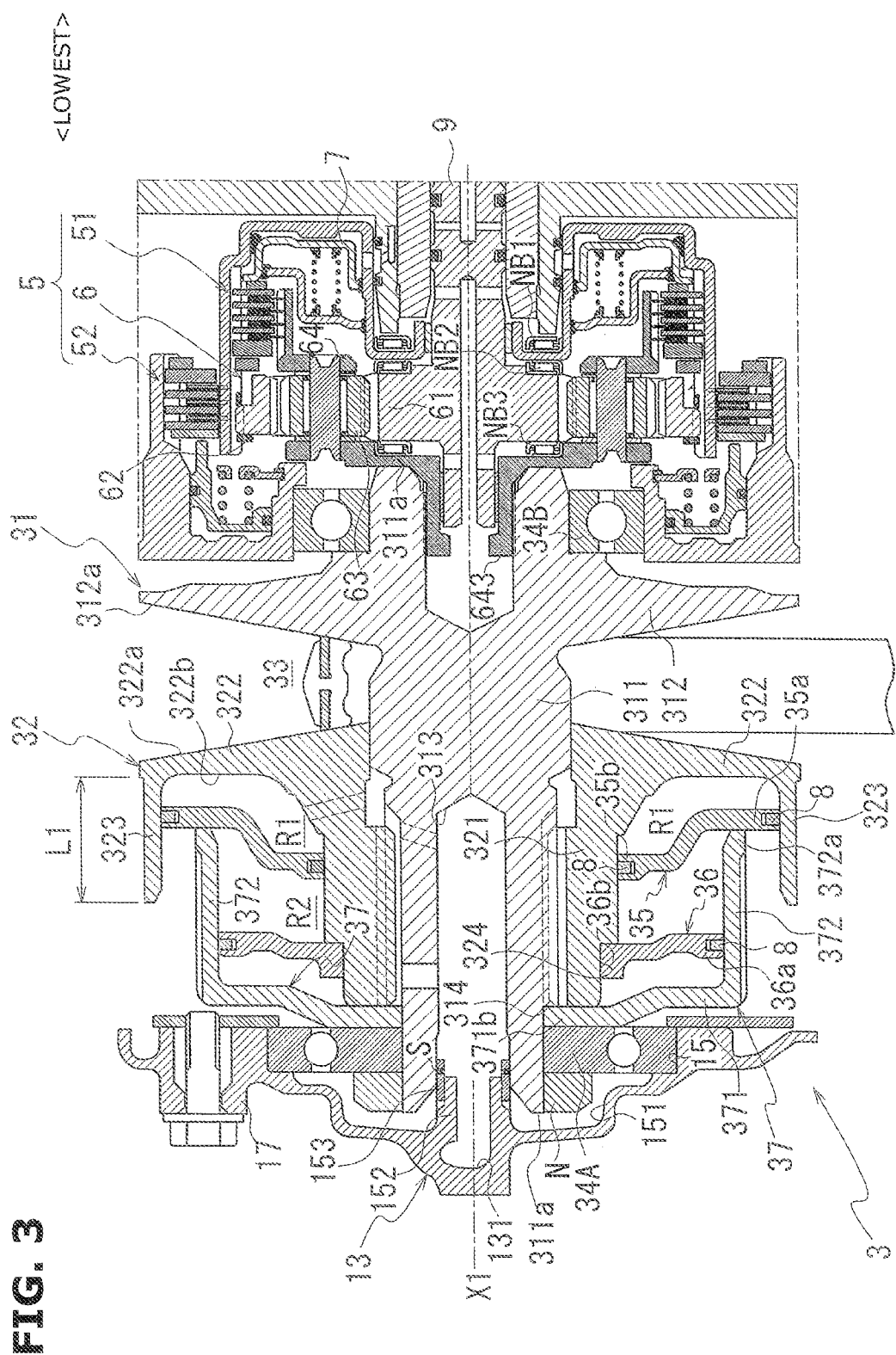
FIG. 3 is a view for explaining a portion around a primary pulley and the forward and backward switching mechanism of the continuously variable transmission.

FIG. 3 is a view for explaining a portion around a primary pulley 3 and the forward and backward switching mechanism 4 of the continuously variable transmission 1.

As shown in FIG. 1, in the belt type continuously variable transmission 1, a rotation drive force of an engine (not shown) which is a driving source is inputted through a torque converter (not shown) to the forward and backward switching mechanism 5.

The forward and backward switching mechanism 5 includes a planetary gear set 6; a forward clutch 51; and a backward brake 52.

In the planetary gear set 6 of the forward and backward switching mechanism 2, when the forward clutch 51 is engaged, the rotation inputted from a torque converter side is outputted in the forward rotation to the variator 2. When the backward brake 52 is engaged, the rotation inputted from the torque converter side is outputted in the reverse rotation to the variator 2.

As shown in FIG. 2, the planetary gear set 6 includes a sun gear 61 configured to rotate as a unit with the rotation transmission shaft 9; a ring gear 62 configured to rotate as a unit with the clutch drum 7; and a pair of pinion gears 63A and 63B disposed between the sun gear 61 and the ring gear 62.

The pinion gear 63A includes a teeth portion formed on the outer circumference. The pinion gear 63B includes a teeth portion formed on the outer circumference. The teeth portions of the pinion gear 63A and the pinion gear 63B are engaged with each other. The pinion gear 63A is engaged with the outer circumference of the sun gear 61. The pinion gear 63B is engaged with the inner circumference of the ring gear 62. The planetary gear set 6 is a planetary gear mechanism of a double pinion type. Besides, the planetary gear set 3 may be a planetary gear mechanism of a single pinion type.

The pinion gear 63A is supported through a needle bearing NB on a pinion shaft 631. Both ends of the pinion shaft 631 are supported on side plate portions 640 and 641 of the carrier 64.

In the planetary gear set 6, when the sun gear 61 and/or the ring gear 62 is rotated around the rotation axis X, the pinion gears 63A supported by the pinion shafts 631, and the pinion gears 63B engaged with the pinion gear 63A are rotated around the rotation axis X while being rotated around own axes.

The planetary gear set 6 and the forward clutch 51 are received within the clutch drum 7.

The clutch drum 7 includes the bottom wall portion 61 having a ring shape when viewed from the rotation axis X direction; the circumference wall portion 72 which is positioned on the outside, and which surrounds the entire outer circumference of the bottom wall portion 71; and the circumference wall portion 73 which is positioned on the inside, and which surrounds the entire inner circumference of the bottom wall portion 71.

The ring gear 62 of the planetary gear set 6 is splined-mounted in the inner circumference of the tip end 72a side of the outer circumference wall portion 72.

The inner circumference wall portion 73 has a cylindrical shape extending along the rotation axis X1. This circumference wall portion 73 is inserted and mounted onto the cylindrical support wall portion 12 which is a fix side member, from the variator 2 side (the left side in FIG. 2).

In this state, the clutch drum 7 is supported on outer circumference of the support wall portion 12, in a state where the rotation around the rotation axis X is allowed.

The inner circumference wall portion 73 includes a connection portion 74 which is formed at a tip end of the circumference wall portion 73, and which extends in the radially inward side (toward the rotation axis X1 side) to avoid the support wall portion 12; and a cylindrical support cylinder 75 which is formed on the inner circumference side of the connection portion 74.

The support cylinder 75 linearly extends from a lower end of the connection portion 74 in a direction apart from the sun gear 61 (the rightward direction in the drawing). A tip end 75a of the support cylinder 75 is located on the inner circumference side of the support wall portion 12. The tip end 75a of the support cylinder 75 confronts, with a clearance, the tip end 14a of the cylindrical shaft 14 mounted in the inner circumference of the support wall portion 12 by the press-fit.

A needle bearing NB1 is provided between the outer circumference of the support cylinder 75 and the inner circumference of the circumference wall portion 73. The needle bearing NB1 is provided between the connection portion 74 and the tip end 12a of the support wall portion 12 in the rotation axis X direction. The needle bearing NB1 prevents the direct contact between the connection portion 74 and the support wall portion 12.

The inner circumference of the support cylinder 75 is supported through a bush BS (metal ring having a small frictional resistance) on the outer circumference of the rotation transmission shaft 9. The clutch drum 7 having the support cylinder 75 is supported on the support wall portion 12 to be rotatable around the rotation axis X1, in a state where the inclination of the clutch drum 7 with respect to the rotation axis X1 is restricted by the support cylinder 75.

The rotation transmission shaft 9 is the output shaft of the torque converter side (not shown). The tip end 9a side of the rotation transmission shaft 9 penetrates through the inner circumference side of the support cylinder 75 in the rotation axis X direction. The sun gear 61 is integrally formed with the outer circumference of the tip end 9a side of the rotation transmission shaft 9 at a position to avoid the interference with the support cylinder 75.

In the rotation transmission shaft 9, the sun gear 61 protrudes in the radially outward direction of the rotation axis X from the outer circumference at a position apart from the tip end portion 9a to the torque converter side (the right side in the drawing).

A needle bearing NB2 is disposed between the connection portion 74 of the clutch drum 7, and a first end surface 61a of the sun gear 61 in the rotation axis X1 direction.

A needle bearing NB3 is disposed between the side plate portion 640, and a second end surface 61a of the sun gear 61 in the rotation axis X1 direction.

The tip end 9a side of the rotation transmission shaft 9 is inserted within a cylindrical connection portion 643 formed on the inner circumference side of the carrier 64.

A bush BS is provided between the outer circumference of the rotation transmission shaft 9 and the inner circumference of the connection portion 643. The connection portion 643 of the carrier 64 is supported through the bush BS on the rotation transmission shaft 9. The connection portion 643 of the carrier 64 and the rotation transmission shaft 9 are configured to be rotated relative to each other around the rotation axis X1.

The side plate portion 640 of the carrier 64 extends in the radially outward direction from an end portion of the connection portion 643 of on the torque converter side. The second end 311b of the shaft portion 311 of the primary pulley 3 is abutted on the side plate portion 640 in the rotation axis X1 direction.

In this state, the inner circumference of the shaft portion 311 and the outer circumference of the connection portion 643 are spline-mounted with each other. The connection portion 643 of the carrier 64 and the shaft portion 311 of the variator 2 side are connected so as not to be rotated relative to each other.

In the planetary gear set 3, the sun gear 31 is an input portion to which the rotation is inputted from the torque converter side. The carrier 64 is an output portion from which the rotation is outputted to the shift mechanism section side.

Besides, the input portion and the output portion are inversed when the vehicle having the continuously variable transmission 1 is towed.

That is, when the vehicle having the continuously variable transmission 1 is towed, the rotation of the driving wheels is inputted from the primary pulley 3 of the variator 2 to the planetary gear set 6.

[Variator 2]

As shown in FIG. 1, the variator 2 includes a pair of pulleys (a primary pulley 3 and a secondary pulley 4); and a belt V (endless annular member) wound around the pair of pulleys.

The variator 2 is configured to vary winding radii of the belt V around the pair of the pulleys (the primary pulley 3 and the secondary pulley 4), thereby to vary the rotation inputted from the forward and backward switching mechanism 5 side by a transmission, and to output the rotation to a final speed reduction mechanism (not shown) side.

In this case, the continuously variable transmission 1 according to the embodiment, the clutch is not provided on the downstream side of the variator 2 on the power transmission path of the rotation driving force of the engine (the driving source). Accordingly, the power transmission is not shut off between the variator 2 and the driving wheels (not shown) side.

Accordingly, the rotation of the driving wheels is inputted to the variator 2 when the vehicle including the continuously variable transmission 1 is towed, so that the pair of the pulleys (the primary pulley 3 and the secondary pulley 4) constituting the variator 2 are rotated. Then, the rotation inputted from the driving wheel side to the variator 2 is finally inputted to the forward and backward switching mechanism 5 side.

The primary pulley 3 includes a fix pulley 31 (fix pulley) and a slide pulley 32 (movable pulley).

The fix pulley 31 includes a shaft portion 311 disposed along a rotation axis X1; and a sheave portion 312 extending from an outer circumference of the shaft portion 311 in the radially outward direction.

Bearings 34A and 34B are inserted and fixed onto a first end 311a and a second end 311b of the shaft portion 311 in a longitudinal direction of the shaft portion 311.

The first end 311a and the second end 311b of the shaft portion 311 are rotatably supported through the bearings 34A and 34B on a support hole 15 of a side cover 13, and a support portion 101 of the transmission case 10.

In this state, the connection portion 643 of the carrier 64 of the planetary gear set 6 (cf. FIG. 3) is connected to the second end 311b of the shaft portion 311 so as not to be rotated relative to the second end 311b.

The slide pulley 32 includes an annular base portion 321 inserted and mounted onto the shaft portion 311 of the fix pulley 31; and a sheave portion 322 extending from the outer circumference of the annular base portion 321 in the radially outward direction.

The annular base portion 321 of the slide pulley 32 is spline-mounted on the outer circumference of the shaft portion 311. The slide pulley 32 is configured to be moved in the axial direction (the rotation axis X1 direction) of the shaft 311 in a state in which the relative rotation between the fix pulley 31 and the slide pulley 32 is restricted.

The sheave portion 312 of the fix pulley 31 confronts the sheave portion 322 of the slide pulley 32 with a clearance in the rotation axis X1 direction.

The primary pulley 3 includes a V groove 33 which is formed between the sheave surface 312a of the fix pulley 31 and the sheave surface 322a of the slide pulley 32, and around which the belt V is wound.

As shown in FIG. 2, a cylindrical cylinder portion 323 is formed on the outer circumference side of the sheave portion 322 on a pressure receiving surface 322b on a side opposite to the sheave surface 322a.

The cylinder portion 323 extends along the rotation axis X1 in a direction apart from the sheave portion 322 to have a predetermined length L1.

An outer circumference portion 35a of a front plunger 35 is abutted on the inner circumference of the cylinder portion 323.

A D ring 8 is mounted on the outer circumference portion 35a of the front plunger 35. The D ring 8 seals a clearance between the inner circumference of the cylinder portion 323 and the outer circumference portion 35a.

The inner circumference portion 35b of the front plunger 35 is abutted on the outer circumference of the annular base portion 321 of the slide pulley 32 from the outer circumference side.

A D ring 8 is mounted on the inner circumference portion 35a of the front plunger 35. The D ring 8 seals a clearance between the outer circumference of the cylinder portion 321 and the inner circumference portion 35b.

In the primary pulley 3, a hydraulic chamber R1 is formed between the front plunger 35 and the sheave portion 322. The pressure receiving chamber R1 (pulley pressure receiving chamber) is configured to receive a hydraulic pressure.

The annular base portion 321 includes a small diameter portion 324 formed at an end portion on a side opposite to the sheave portion 322.

A ring-shaped rear plunger 36 is press-fit on the small diameter portion 324. An inner circumference portion 36b of the rear plunger 36 is pressed and fixed to a stepped portion of the small diameter portion 324 on the sheave portion 322 side (a right side in the drawing).

In this state, the rear plunger 36 is provided in a state where the relative rotation between the rear plunger 36 and the annular base portion 321 is restricted so as not to be moved in the rotation axis X1 direction.

An outer circumference portion 36a of the rear plunger 36 is abutted on an inner circumference of a cylindrical cylinder wall portion 372 of the rear cylinder 37.

A D ring 8 is mounted on the outer circumference portion 36a of the rear plunger 36. The D ring 8 seals a clearance between the inner circumference of the circumference wall portion 372 and the outer circumference portion 36a.

The rear cylinder 37 includes a circular plate portion 371 inserted and mounted onto the shaft portion 311; and a circumference wall portion 372 surrounding an entire outer circumference of the circular plate portion 371.

The shaft portion 311 is press-fit in the inner circumference portion 371b of the circular plate portion 371. The inner circumference portion 371b of the circular plate portion 371 is sandwiched between a stepped portion 314 of the shaft portion 311, and the bearing 34A inserted and mounted onto the shaft portion 311.

The bearing 34A is positioned in the rotation axis X direction by a nut N screwed on the outer circumference of the shaft portion 311. The movement of the rear cylinder 37 adjacent to the bearing 34A in the direction apart from the slide pulley 32 is restricted by the bearing 34A.

The circumference wall portion 372 has an outside diameter smaller than an inside diameter of the cylindrical cylinder portion 323. A tip end portion 372a of the circumference wall portion 372 is abutted on the front plunger 35 in the rotation axis X direction within the cylinder portion 323.

The tip end portion 372a of the circumference wall portion 372 restricts the movement of the front plunger 35 in a direction apart from the sheave portion 322 (the leftward direction in the drawing).

The outer circumference portion 35a and the inner circumference portion 35b of the front plunger 35 are offset from each other in the rotation axis X1 direction. The outer circumference portion 35a is positioned on the sheave portion 322 side of the slide pulley 32 relative to the inner circumference portion 35b.

The tip end portion 372a of the circumference wall portion 372 is abutted on the region of the outer circumference portion 35a of the front plunger 35 from the rotation axis X1 direction.

In the primary pulley 3, a space surrounded by the rear plunger 36, the front plunger 35, the circumference wall portion 372 of the rear cylinder 37 is a second pressure receiving chamber R2. The pressure receiving chamber R2 (pulley pressure chamber) is configured to receive the hydraulic pressure.

The pressure receiving chamber R1 and the pressure receiving chamber R2 are adjacent to each other to sandwich the front plunger 35 on the bottom side (the left side in the drawing) when viewed from the sheave surface 322a. These pressure receiving chamber R1 and pressure receiving chamber R2 constitute a pulley pressure receiving chamber of the primary pulley 3.

Accordingly, it is possible to decrease the pressure receiving area of each of the pulley pressure receiving chambers (the pressure receiving chamber R1 and R2). Therefore, it is possible to decrease the outside diameter of the primary pulley 3 (the sheave portion 322 and 312).

The shaft portion 311 of the fix pulley 31 includes an in-shaft oil passage 313 configured to supply the hydraulic pressure to the pressure receiving chamber R1 and the pressure receiving chamber R2.

The in-shaft oil passage 313 of the shaft portion 311 is opened in the one end 311a on the side cover 13 side (the left side in the drawing). A support cylinder 152 of the side cover 13 is loosely mounted in the in-cylinder oil passage 313 on the side cover 13 side (the left side in the drawing). A cylindrical bush 153 is inserted and mounted onto the support cylinder 152. A portion of the shaft portion 311 on the side cover 13 side is rotatably supported by the bush 153 mounted in the in-shaft oil passage 313.

In this state, a seal ring S provided on the outer circumference of the bush 153 seals a clearance between the outer circumference of the bush 153 and the inner circumference of the in-shaft oil passage 313.

The side cover 13 includes a support hole 15 which is formed at a portion confronting the transmission case 10, and which is for the bearing 34A. The side cover 13 includes a recessed portion 151 formed at a central portion of the support hole 15 when viewed in the rotation axis X1 direction, and which is for avoiding the interference with the shaft portion 311 of the fix pulley 31. The support cylinder 152 is provided at a central portion of the recessed portion 151.

The support cylinder 152 is configured to receive the hydraulic pressure (oil OL) from a hydraulic pressure control circuit (not shown) through a hydraulic passage 131 within the side cover. The hydraulic pressure supplied to the support cylinder 152 is supplied through the in-shaft oil passage 313 to the pressure receiving chambers R1 and R2 (pulley pressure receiving chamber) of the slide pulley 32.

In the primary pulley 3, the slide pulley 32 is configured to be displaced in the rotation axis X1 direction by adjusting the supply pressure to the pressure receiving chambers R1 and R2 (the pulley pressure chamber) of the slide pulley 32. With this, the groove width of the V groove 33 between the sheave surfaces 312a and 322a is varied in accordance with the supply pressure of the oil OL, so that the winding radii of the belt V in the primary pulley 3 is varied.

As shown in FIG. 1, the secondary pulley 4 includes a fix pulley 41 (fix pulley) and a slide pulley 42 (movable pulley).

The fix pulley 41 includes a shaft portion (pulley shaft) 411 disposed along a rotation axis X2; and a sheave portion 412 extending from an outer circumference of the shaft portion 411 in the radially outward direction.

The slide pulley 42 includes an annular base portion 421 inserted and mounted onto the shaft portion 411 of the fix pulley 41; and a sheave portion 422 extending from the outer circumference of the annular base portion 421 in the radially outward direction.

The sheave portion 412 of the fix pulley 41 confronts the sheave portion 422 of the slide pulley 42 with a clearance in the rotation axis X2 direction.

The secondary pulley 4 includes a V groove 43 which is formed between the sheave surface 412a of the fix pulley 41 and the sheave surface 422a of the slide pulley 42, and around which the belt V is wound.

Bearings 44A and 44B are inserted and fixed onto a first end 411a and a second end 411b of the shaft portion 411 of the fix pulley 41 in the rotation axis X2 direction.

The second end portion 411b of the shaft portion 411 in the rotation axis X2 direction is rotatably supported through the bearing 44B on the support portion 102 of the transmission case 10 side.

The first end portion 411a of the shaft portion 411 in the rotation axis X2 direction is rotatably supported through the bearing 44A on the support hole 16 of the side cover 13 side.

The side cover 13 includes the support hole 16 which is formed at a portion confronting the transmission case 10, and which is for the bearing 44A. The side cover 13 includes a recessed portion 161 formed at a central portion of the support hole 16 when viewed in the rotation axis X2 direction, and which is for avoiding the interference with the shaft portion 411 of the fix pulley 41.

The support cylinder 162 is provided at a central portion of the recessed portion 161. The support cylinder 162 protrudes toward the transmission case 10 side (the right side in the drawing). A tip end side of the support cylinder 162 is loosely mounted in an in-shaft oil passage 413 of the fix pulley 41.

A cylindrical bush 163 is inserted and mounted onto the support cylinder 162. A portion of the shaft portion 411 on the side cover 13 side is rotatably supported by the bush 163 mounted in the in-shaft oil passage 413.

In this state, a seal ring S provided on the outer circumference of the bush 163 seals a clearance between the outer circumference of the bush 163 and the inner circumference of the in-shaft oil passage 413.

The in-shaft oil passage 413 is opened on the first end portion 411a of the shaft portion 411. The in-shaft oil passage 413 linearly extends along the rotation axis X2 of the fix pulley 41 within the shaft portion 411. The in-shaft oil passage 413 extends within the inner circumference side of the slide pulley 42 mounted onto the shaft portion 411 in the rotation axis X2 direction.

An oil hole 414 is formed at a tip end side (the right side in the drawing) of the in-shaft hydraulic passage 413. The oil hole 414 is configured to connect the in-shaft hydraulic passage 413 and the outer circumference of the shaft portion 411.

The support cylinder 162 is configured to receive the hydraulic pressure from the hydraulic pressure control circuit (not shown) through a hydraulic passage 132 within the side cover. The hydraulic pressure supplied to the support cylinder 162 is supplied through the in-shaft oil passage 413 to the pressure receiving chambers R3 positioned radially outside the shaft portion 411.

In the secondary pulley 4, the slide pulley 42 is configured to be displaced in the rotation axis X2 direction by adjusting the supply pressure to the pressure receiving chamber R3 (the pulley pressure chamber) of the slide pulley 42. With this, the groove width of the V groove 43 between the sheave surfaces 412a and 422a is varied in accordance with the supply pressure of the oil OL, so that the winding radii of the belt V in the secondary pulley 4 is varied.

The sheave portion 422 of the slide pulley 42 includes a cylinder portion 423 formed on a pressure receiving surface 422b on a side opposite to the sheave surface 422a.

The cylinder portion 423 extends along the rotation axis X2 in a direction apart from the sheave portion 422 to have a predetermined length L2.

An outer circumference portion 45a of a plunger 45 is abutted on the inner circumference of the cylinder portion 423.

A D ring 8 is mounted on the outer circumference portion 45a of the plunger 45. The D ring 8 seals a clearance between the inner circumference of the cylinder portion 423 and the outer circumference portion 45a.

The plunger 45 includes a cylindrical mounting portion 451 formed on the inner circumference side. The mounting portion 451 is spline-mounted on the outer circumference of the shaft portion 411 of the fix pulley 41. The mounting portion 451 of the plunger 45 is positioned between the bearing 44B and the stepped portion 411c of the shaft portion 411 in the rotation axis X2 direction.

A region of the plunger 45 adjacent to the mounting portion 451 extends in a direction toward the sheave portion 422 (the leftward direction in the drawing) on the outer circumference side of the annular base portion 421 of the slide pulley 42, and bends toward the outer circumference side.

In the plunger 45, a first end of the spring Sp is abutted on a region bent on the outer circumference side from the rotation axis X2 direction. A second end of the spring Sp is abutted on the pressure receiving surface 422b of the sheave portion 422. The spring Sp is provided in a state where the spring Sp is compressed in the rotation axis X direction. The slide pulley 42 is pressed by the urging force acted by the spring Sp in a direction where the groove width of the V groove 43 is decreased.

With this, the clamping force of the belt V in the secondary pulley 4 is maintained at the stop of the engine (driving force) at which the oil is not supplied from the hydraulic pressure control circuit to the pressure receiving chambers R1, R2, and R2 of the variator 2 side.

Besides, when the vehicle including the continuously variable transmission 1 is towed, the engine (the driving source) is the stop state. The hydraulic pressure supplied from the oil pump driven by the engine to the pressure receiving chamber R1, R2, and R3 is stopped In this case, the direction in which the urging force of the spring Sp is acted is a direction in which the transmission gear ratio of the variator 2 is varied toward the lowest transmission gear ratio. That is, the direction in which the urging force of the spring Sp is a direction in which the winding radius of the belt V in the secondary pulley 4 is increased.

When the winding radius of the belt V in the secondary pulley 4 is increased, the winding radius of the belt V in the primary pulley 3 is decreased in a case where the oil is not supplied to the pressure receiving chambers R1 and R2 of the primary pulley 3.

Accordingly, when the oil is not supplied from the hydraulic pressure control circuit to the engine (the driving source), the variator 2 becomes the lowest transmission gear ratio, or the transmission gear ratio near the lowest transmission gear ratio.

In this state, when the vehicle including the continuously variable transmission 1 is towed and traveled, the speed of the rotation inputted from the driving wheel side to the secondary pulley 4. Then, the speed-increased rotation is outputted from primary pulley 3.

As described above, the shaft portion 311 of the primary pulley 3 is connected to the carrier 64 (the connection portion 643) of the planetary gear set 6. Accordingly, the speed-increased rotation is inputted to the carrier 64 of the planetary gear set 6.

Accordingly, the primary pulley 3, and the carrier 64 of the planetary gear set 6 are rotated at the higher speed as the travel speed is increased when the vehicle is towed.

When the travel speed when the vehicle is towed becomes equal to or greater than a predetermined speed, there are concerns that the durability of the bearings 34A and 34B supporting the shaft portion 311 of the primary pulley 3, and the needle bearings NB2 and NB3 positioned on the both sides of the sun gear 61 in the planetary gear set 6 is influenced.

This is because the engine (the driving source) is stopped when the vehicle is towed, so that the oil OL for the lubrication is not supplied from the hydraulic pressure control circuit to the bearing 34A and 34B, the needle bearings NB2 and NB3, and so on.

In particular, in a case where the ignition is switched to the off state when the vehicle is towed, the power supply (the electricity supply) from the battery and the generator is stopped. Accordingly, the engine, and the electric oil pump are stopped. Moreover, the hydraulic pressure is not supplied from the electric pump. Therefore, all of the actuators for the hydraulic pressure control are stopped.

Accordingly, the oil OL for the lubrication is newly supplied to the bearings 34A and 34B, the needle bearings NB2 and NB3, and so on.

Figure 4B:
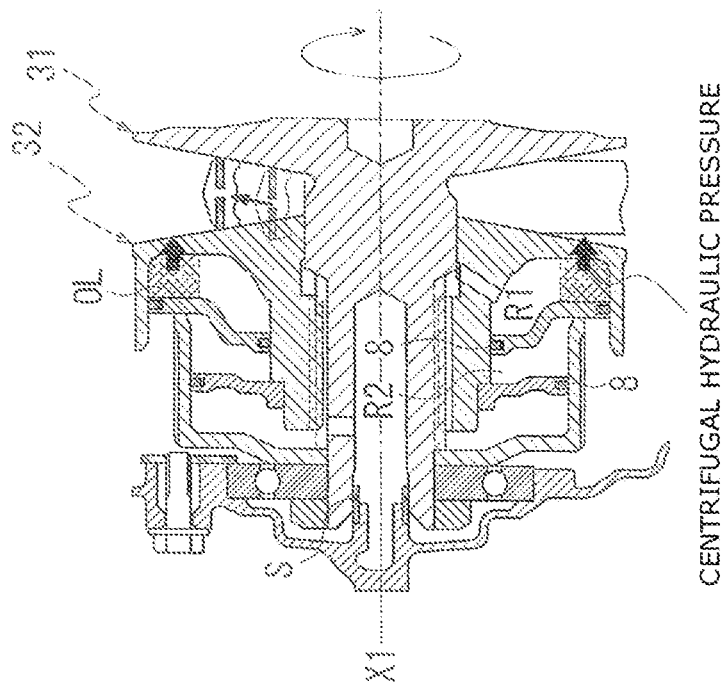
FIGS. 4A and 4B are views for explaining an operation of a pressure receiving chamber (pulley pressure receiving chamber) when a vehicle is towed.
Figure 4A:
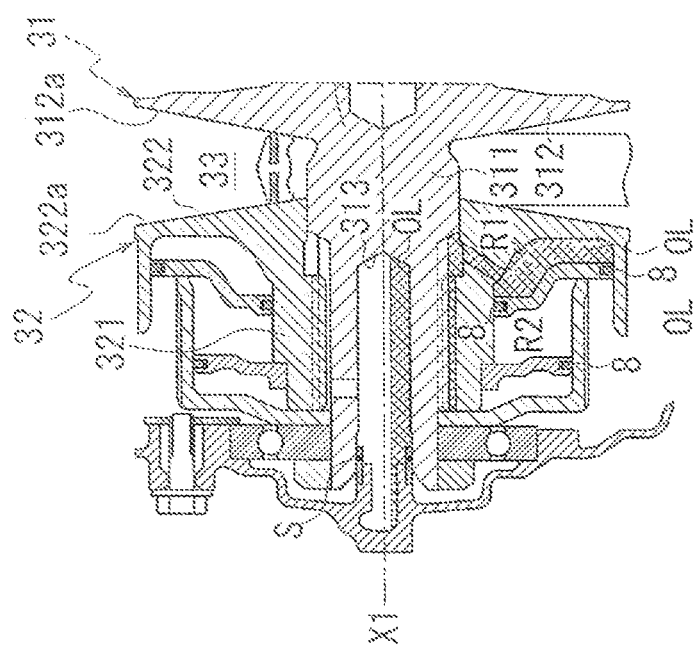

FIGS. 4A and 4B are views for explaining the operation of the pressure receiving chambers R1 and R2 (the pulley pressure receiving chamber) when the vehicle is towed. FIG. 4A is a view showing a state of the oil OL remained within the pressure receiving chamber R1 when the vehicle including the continuously variable transmission 1 is stopped in a state where the oil OL is not supplied from the hydraulic pressure control circuit. FIG. 4B is a view showing the operation of the oil OL remained within the pressure receiving chamber R1 when the vehicle including the continuously variable transmission 1 is towed and traveled (towed state) in a state where the oil OL is not supplied from the hydraulic pressure control circuit.

Besides, in FIGS. 4A and 4B, the cross hatching is added to the remained oil OL.

As described above, in the continuously variable transmission 1 according to the embodiment, the seals for the front plunger 35 and the rear plunger 36 are the D rings 8 having the high seal characteristic.

In particular, in the slide pulley 32, the D rings 8 seal the clearance between the clearance between the outer circumference portion 35a of the front plunger 35, and the clearance between the inner circumference portion 35b of the front plunger 35 and the outer circumference of the annular base portion 321. Accordingly, the pressure receiving chamber R1 is oil-tightly sealed.

Moreover, the D ring 8 seals the clearance between the outer circumference portion 36a of the rear plunger 36, and the inner circumference of the circumference wall portion 372 of the rear cylinder 37. The inner circumference portion 36b of the rear plunger 36 is press-fit on the small diameter portion 324 of the annular base portion 321. Accordingly, the pressure receiving chamber R2 is oil-tightly sealed.

Furthermore, in the in-shaft oil passage 313 configured to supply the oil to the pressure receiving chambers R1 and R2, the seal ring S seals the clearance between the inner circumference of the in-shaft oil passage 313, and the outer circumference of the bush 153 mounted in the in-shaft oil passage 313. Accordingly, the in-shaft oil passage 313 is oil-tightly sealed.

At least the oil OL within the pressure receiving oil R1 is not fully released after the supply of the oil OL through the in-shaft oil passage 313 to the pressure receiving chambers R1 and R2 is stopped by the stop of the oil pump according to the stop of the engine (the driving source) (cf. FIG. 4A).

FIG. 4A shows a state in which the oil OL is remained in the lower region in the vertical direction with respect to the setting state (installation state) of the continuously variable transmission 1.

In the state of FIG. 4A, when the vehicle including the continuously variable transmission 1 is towed and traveled, the rotation inputted from the driving wheel side to the secondary pulley 4 is inputted through the belt V to the primary pulley 3, so that the primary pulley 3 is rotated around the rotation axis X1 (cf. FIG. 4B).

With this, the oil OL remained within the pressure receiving chamber R1 is moved toward the outer circumference side by the centrifugal force by the rotation. Consequently, as shown in FIG. 4B, the oil OL within the pressure receiving chamber R1 is collected on the inner circumference of the cylinder portion 323.

Then, when the travel speed of the towed vehicle is increased, the force pressing of the oil OL within the pressure receiving chamber R1 against the inner circumference of the cylinder portion 323 is increased, so that the centrifugal hydraulic pressure is generated within the pressure receiving chamber R1.

This centrifugal hydraulic pressure is acted in a direction in which the slide pulley 32 is moved toward the fix pulley 31 (the rightward direction in the drawing). That is, the centrifugal hydraulic operation is generated to generate the thrust in the direction to decrease the groove width of the V groove 33 of the primary pulley 3.

With this, a difference (thrust difference) between the thrust generated on the secondary pulley 4 side by the urging force of the spring Sp, and the thrust generated on the primary pulley 3 side by the centrifugal hydraulic operation is decreased in accordance with the increase of the travel speed of the vehicle which is towed and traveled.

Then, when the travel speed of the vehicle which is towed and traveled exceeds a predetermined vehicle speed (threshold speed), the transmission gear ratio of the variator 2 is varied from the lowest transmission gear ratio to the high transmission gear ratio side.

With this, the rotation inputted from the primary pulley 3 to the forward and backward switching mechanism 5 (the planetary gear set 6) becomes smaller than the rotation at the lowest transmission gear ratio.

Besides, the variation amount of the transmission gear ratio of the variator 2 to the high transmission gear ratio side becomes greater as the travel speed of the towed vehicle becomes greater. Accordingly, the rotation inputted from the primary pulley 3 to the forward and backward switching mechanism 5 (the planetary gear set 6) becomes smaller as the travel speed of the towed vehicle becomes greater.

Accordingly, it is possible to prevent the primary pulley 3 from reaching the extremely high rotation speed like the conventional device, after the travel speed of the towed vehicle exceeds the predetermined vehicle speed (threshold speed).

With this, it is possible to prevent the generation of the influences on the durability of the bearing abutted on the primary pulley, and the durability of the bearing of the planetary gear set 6 side.

In this embodiment, the following conditions are set so that the sheave portion 322 of the slide pulley 32 is displaced in a direction closer to the sheave portion 312 of the fix pulley 31 when the travel speed of the vehicle which is towed and traveled exceeds the predetermined vehicle speed (the threshold speed).

(a) a volume of the pressure receiving chamber R1, (b) a volume of the path (the oil passage) from the in-shaft oil passage 313 to the pressure receiving chamber R1, (c) the oil amount remained in the pressure receiving chamber R1 (the pulley pressure receiving chamber) of the primary pulley 3 when the transmission gear ratio of the variator 2 is the lowest transmission gear ratio.

Besides, the oil amount remained in the pressure receiving chamber R1 (the pulley pressure receiving chamber) of the primary pulley 3 when the transmission gear ratio of the variator 2 is the lowest transmission gear ratio is previously derived from the calculate and/or the experiment in consideration of the thrust generated by the spring Sp provided to the secondary pulley 4.

A distance between the front plunger 35 of the primary pulley 3 and the pressure receiving surface 322b of the pulley 32 when the transmission gear ratio of the variator is the lowest transmission gear ratio is set so that the derived oil amount is remained.

Besides, in a case where the travel speed of the towed vehicle is smaller than the predetermined vehicle speed, the above-described conditions are set so that the transmission gear ratio of the variator 2 is maintained to the lowest transmission gear ratio even when the centrifugal hydraulic operation of the oil stored in the pressure receiving chamber R1 of the primary pulley is generated.

This is because it is unnecessary that the transmission gear ratio is brought to the high transmission gear ratio side when the rotation speed of the primary pulley 3 does not influence on the durability of the bearing abutted on the primary pulley, and the durability of the bearing of the planetary gear set 6 side.

Moreover, in this embodiment, when the transmission gear ratio of the variator 2 is varied from the lowest transmission gear ratio to the high transmission gear ratio side, the varied transmission gear ratio is set to be the transmission gear ratio on the high side of the lowest transmission gear ratio, and to be on the low side of the middle transmission gear ratio between the lowest transmission gear ratio and the highest transmission gear ratio.

This is because the transmission gear ratio is easy to be returned to the lowest transmission gear ratio in consideration of the restart characteristic when the rotation speed of the driving wheels is decreased. Moreover, this is because it is not preferable that the transmission gear ratio is extremely varied in a state where the oil OL is not supplied to the pressure receiving chamber R1 (the pulley pressure receiving chamber).

Moreover, the torque necessary for moving the pulley in the towed vehicle is increased as the transmission gear ratio becomes the higher side.

In this case, the towing vehicle (towing the towed vehicle) needs the greater driving force (the power), so that the load of the towing vehicle becomes large. Accordingly, it is preferable that the load does not become excessive.

In this way, in the continuously variable transmission 1 according to the embodiment, the hydraulic pressure supply from the oil pump driven by the engine to the pressure receiving chambers R1, R2, and R3 is not performed when the vehicle including the continuously variable transmission 1 is towed. This is because the engine (the driving source) Is stopped, and the oil pump driven by the engine is stopped.

Accordingly, the configuration is set so that the oil OL is remained within the pressure receiving chamber R1 of the primary pulley 3. In the towed state, the thrust is generated by the centrifugal hydraulic operation generated by the oil OL remained in the pressure receiving chamber R1 so that the transmission gear ratio of the variator 2 is shifted from the lowest transmission gear ratio to the high side.

With this, it is possible to prevent the primary pulley 3 from rotating at the extremely high rotation speed due to the rotation inputted from the driving wheel side, so as not to influence on the durability of the bearing supporting the primary pulley 3, and the durability of the adjacent planetary gear set 6 side.

In the towed state of the vehicle, in particular, when the ignition is switched to the off state in the towed state of the vehicle, the oil pump driven by the engine (the driving source) is stopped. The oil OL for the driving is not supplied to the variator 2.

Accordingly, the thrust acted to the pressure receiving chambers R1 and R2 of the primary pulley 3 (the thrust in the direction in which the transmission gear ratio of the variator 2 is shifted to the high side) is only the thrust by the centrifugal hydraulic operation.

That is, the transmission gear ratio of the variator 2 is shifted from the lowest transmission gear ratio to the high transmission gear ratio side by the thrust by the centrifugal hydraulic operation.

As described above, the continuously variable transmission 1 according to the embodiment includes the following configuration.

(1) A continuously variable transmission 1 for a vehicle includes: a variator 2 including; a primary pulley 3, a secondary pulley 4, and a belt V (endless annular member) wound around the primary pulley 3 and the secondary pulley 4.

The secondary pulley 4 is provided with a spring Sp (urging member) configured to generate an urging force in a direction in which a groove width of the groove width 43 of the secondary pulley 4 is decreased.

A transmission gear ratio of the variator is brought to a high side of a lowest transmission gear ratio by a centrifugal hydraulic operation of an oil stored in a pulley pressure receiving chamber of the primary pulley 3 when a vehicle speed becomes equal to or greater than a predetermined vehicle speed when the vehicle is towed.

In a case where a size of the primary pulley 3 is designed so that the sufficient oil amount is remained in the pressure receiving chambers R1 and R2 (pulley pressure receiving chamber) of the primary pulley 3 when the transmission gear ratio of the variator 2 is the lowest transmission gear ratio, the following operations are attained.

(a) When the primary pulley 3 becomes the high rotation speed when the vehicle is towed, the centrifugal force is acted to the remained oil, so as to generate the centrifugal hydraulic operation by which the thrust in the direction where the groove width of the V groove 33 of the primary pulley 3 is decreased.

With this, the thrust difference between the primary pulley 3 and the secondary pulley 4 is decreased, so that the transmission gear ratio of the variator 2 becomes the high side of the lowest transmission gear ratio.

Accordingly, the rotation speed of the primary pulley 3 is in the decreasing direction when the vehicle speed is increased. Therefore, it is possible to suppress the primary pulley 3 from reaching the extremely high rotation speed.

With this, it is possible to prevent the primary pulley 3 from reaching the extremely high rotation speed. Accordingly, it is possible to prevent the generation of the situation in which the durability of the bearing abutted on the primary pulley 3, and the durability of the bearing of the planetary gear set 6 side are influenced.

The continuously variable transmission 1 according to the embodiment includes the following configuration.

(2) When the vehicle speed of the vehicle is smaller than the predetermined vehicle speed (threshold speed) in the towed state, the transmission gear ratio of the variator 2 is maintained to the lowest transmission gear ratio even when the centrifugal hydraulic operation of the oil stored in the pressure receiving chamber R1 (pulley pressure receiving chamber) of the primary pulley 3 is generated.

The hydraulic pressure is not supplied in the towed state. Accordingly, it is preferable that the transmission gear ratio is not varied as much as possible. There are no concerns that the primary pulley 3 becomes extremely high rotation speed when the vehicle speed is not extremely increased. Therefore, the lowest transmission gear ratio is maintained.

The continuously variable transmission 1 according to the embodiment includes the following configuration.

(3) When a vehicle speed becomes equal to or greater than a predetermined vehicle speed when the vehicle is towed, the transmission gear ratio of the variator 2 is brought to the high side of the lowest transmission gear ratio, and to a low side of a middle transmission gear ratio (the transmission gear ratio="1"), by the centrifugal hydraulic operation of the oil OL stored in the pressure receiving chamber R1 (pulley pressure receiving chamber) of the primary pulley 3.

(a) It is preferable that the transmission gear ratio is easy to be returned in consideration of the restart characteristic when the rotation is decreased. (b) It is not preferable that the transmission gear ratio is extremely varied when the hydraulic pressure is not supplied to the pulley pressure receiving chamber. Accordingly, the transmission gear ratio is maintained to be greater than the transmission gear ratio closer to the lowest transmission gear ratio side, for example, the transmission gear ratio="1" (the middle transmission gear ratio).

Besides, FIG. 4A shows, as example, a case where the oil OL is remained in a part of the pressure receiving chamber R1 and the in-shaft oil passage 313 when the vehicle including the continuously variable transmission 1 is stopped in the state where the oil OL is not supplied from the hydraulic pressure control circuit.

The remaining state of the oil OL is not limited to the above-described state. For example, the configuration is set so that the oil OL is densely remained in the entire region of the pressure receiving chamber R1 and the in-shaft oil passage 3123 as long as the necessary centrifugal hydraulic operation is generated.

Hereinabove, the embodiment of the present invention is explained. The present invention is not limited to the aspects shown in the embodiment. The present invention can be varied as long as the variation is within the technical thought of the present invention.

The invention claimed is:

1. A continuously variable transmission for a vehicle comprising:
   a variator including;
   a primary pulley,
   a secondary pulley, and
   an endless annular member wound around the primary pulley and the secondary pulley,
   the secondary pulley being provided with an urging member configured to generate an urging force in a direction in which a groove width of the secondary pulley is decreased, and
   a pressure receiving chamber of the primary pulley being sealed so that an oil is remained after a stop of a supply of the oil to the pressure receiving chamber of the primary pulley, and
   an amount of the oil remained after the stop of the supply of the oil to the pressure receiving chamber of the primary pulley being set so that when a vehicle speed becomes equal to or greater than a predetermined vehicle speed when the vehicle is towed, a transmission gear ratio of the variator is brought to a high side of a lowest transmission gear ratio, and to a low side of a middle transmission gear ratio, by a centrifugal hydraulic operation of the oil stored in the pulley pressure receiving chamber of the primary pulley.

2. The continuously variable transmission for the vehicle as claimed in claim 1, wherein when the vehicle speed is smaller than the predetermined vehicle speed, the transmission gear ratio of the variator is maintained to the lowest transmission gear ratio even when the centrifugal hydraulic operation of the oil stored in the pressure receiving chamber of the primary pulley is generated.

* * * * *